(12) United States Patent
Zak et al.

(10) Patent No.: US 8,112,396 B2
(45) Date of Patent: Feb. 7, 2012

(54) BACKUP AND RECOVERY OF INTEGRATED LINKED DATABASES

(75) Inventors: Dorota Zak, Mississauga (CA); Suavek Zajac, Oakville (CA)

(73) Assignee: EMC Corporation, Hopkinton, MA (US)

( * ) Notice: Subject to any disclaimer, the term of this patent is extended or adjusted under 35 U.S.C. 154(b) by 401 days.

(21) Appl. No.: 11/448,524

(22) Filed: Jun. 7, 2006

(65) Prior Publication Data
US 2007/0288534 A1 Dec. 13, 2007

(51) Int. Cl.
G06F 7/00 (2006.01)
G06F 17/00 (2006.01)

(52) U.S. Cl. ............... 707/640; 707/674; 707/999.202; 707/999.204

(58) Field of Classification Search .................. None
See application file for complete search history.

(56) References Cited

U.S. PATENT DOCUMENTS

| | | | | |
|---|---|---|---|---|
| 5,369,757 A * | 11/1994 | Spiro et al. | ...................... | 714/19 |
| 5,832,508 A * | 11/1998 | Sherman et al. | ...................... | 1/1 |
| 5,890,167 A * | 3/1999 | Bridge et al. | ................ | 707/204 |
| 6,088,694 A * | 7/2000 | Burns et al. | ............................. | 1/1 |
| 6,115,704 A * | 9/2000 | Olson et al. | ............................. | 1/1 |
| 6,115,722 A * | 9/2000 | Isip et al. | ............................. | 1/1 |
| 6,163,776 A * | 12/2000 | Periwal | ............................. | 707/4 |
| 6,226,651 B1 * | 5/2001 | Masuda et al. | ....................... | 1/1 |
| 6,289,357 B1 * | 9/2001 | Parker | ........................... | 707/610 |
| 6,453,325 B1 * | 9/2002 | Cabrera et al. | ............... | 707/204 |
| 6,499,036 B1 * | 12/2002 | Gurevich | ..................... | 707/778 |
| 6,519,614 B1 * | 2/2003 | Kanai et al. | .......................... | 1/1 |
| 6,546,474 B1 * | 4/2003 | Weigelt | .......................... | 711/162 |
| 6,681,229 B1 * | 1/2004 | Cason et al. | .......................... | 1/1 |
| 6,775,683 B2 * | 8/2004 | Kabasakalian et al. | ........ | 707/200 |
| 6,925,477 B1 * | 8/2005 | Champagne et al. | ........ | 707/203 |
| 7,043,504 B1 * | 5/2006 | Moore et al. | .................. | 707/202 |
| 7,069,339 B2 * | 6/2006 | Champlin | ..................... | 709/244 |
| 7,069,401 B1 * | 6/2006 | Noonan et al. | ............... | 711/162 |
| 7,076,492 B2 * | 7/2006 | Campbell et al. | ............. | 717/102 |
| 7,127,479 B2 * | 10/2006 | Tsaur et al. | .................... | 707/204 |
| 7,188,187 B2 * | 3/2007 | Hirabayashi et al. | ........ | 709/232 |
| 7,206,790 B2 * | 4/2007 | Kodama | ........................ | 707/102 |
| 7,848,970 B2 * | 12/2010 | Kane et al. | ..................... | 705/30 |
| 2002/0184244 A1 * | 12/2002 | Hsiao et al. | ................... | 707/201 |
| 2004/0267835 A1 * | 12/2004 | Zwilling et al. | ............... | 707/202 |
| 2005/0187974 A1 * | 8/2005 | Gong | ........................ | 707/104.1 |
| 2005/0193245 A1 * | 9/2005 | Hayden et al. | .................. | 714/13 |
| 2005/0278393 A1 * | 12/2005 | Huras et al. | .................... | 707/202 |
| 2006/0004846 A1 * | 1/2006 | Murley et al. | ............. | 707/103 R |
| 2006/0036895 A1 * | 2/2006 | Henrickson | ....................... | 714/4 |
| 2006/0112314 A1 * | 5/2006 | Soto | ............................... | 714/38 |
| 2006/0179085 A1 * | 8/2006 | Kaijima et al. | ............... | 707/204 |
| 2006/0206544 A1 * | 9/2006 | Oks et al. | ....................... | 707/204 |
| 2007/0185922 A1 * | 8/2007 | Kapoor et al. | ................ | 707/202 |
| 2007/0185939 A1 * | 8/2007 | Prahland et al. | .............. | 707/204 |
| 2008/0281865 A1 * | 11/2008 | Price et al. | ............... | 707/103 Y |

FOREIGN PATENT DOCUMENTS

WO WO 01/04797 A1 * 1/2001
WO WO 0104797 * 1/2001

* cited by examiner

Primary Examiner — Wilson Lee
Assistant Examiner — Jessica N Le
(74) Attorney, Agent, or Firm — Barry N. Young

(57) ABSTRACT

A programmatic method for automatically backing up and restoring an integrated database system including a Lotus Notes/Domino loosely structured database and a linked DB2 relational database that stores data mapped from the Domino database. The method includes integrated first and second client application programs running on server hosts for backup and recovery of the Domino and DB2 databases that communicate with the database managers for the databases using client application APIs. Backup and recovery of the integrated linked databases is controlled by the client application associated with the Domino database.

19 Claims, 7 Drawing Sheets

BACKUP AND RECOVERY OF INTEGRATED LINKED DATABASES

BACKGROUND

This invention relates generally to the backup and recovery of computer databases, and more particularly to the backup and recovery of linked databases having different database structures in an integrated database system.

There are several client/server groupware software products which enable collaboration among users in workgroups on a network. These products may include several collaborative applications such as instant messaging, e-mail, calendar and browser applications, and may store data of workgroup users in one or more databases. Due to the generally unstructured nature of the data, the databases are typically loosely structured. An example of such a collaborative client/server software product is Lotus Notes/Domino, a product of IBM. The Lotus Notes/Domino product is a cross-platform, secure, distributed database application development environment that includes pre-built collaborative applications such as e-mail, calendar, etc. The product comprises a Domino server and a Notes client. Domino and Notes data is stored in databases referred to as either a Notes database or a Domino database. Notes databases are loosely structured. They are document centric, meaning they allow multiple values in items (fields). They do not have a schema, tables, keys, inter-relational integrity, or other characteristics of more structured types of databases, such as relational databases. The Notes/Domino database may be distributed, i.e., there may be several copies of the same database replicated on different servers and clients. Databases stored on a Notes client are referred to as local databases, are visible only to a local user, and can be accessed by only a single user at a time. The databases stored on the Domino server are visible to many users, and can be accessed simultaneously by multiple users. The schema-less, substantially unstructured database architecture means that the database is uniquely able to store the highly disparate data types which characterize a Notes/Domino environment.

Although the Notes/Domino database has a full text search engine, its lack of structure is a disadvantage because it is not amenable to the more powerful and flexible constructs and SQL (Structured Query Language) queries available in more structured databases, such as a relational database. As a result, it is desirable to link a loosely structured database, such as the Notes/Domino database, with a relational database to form an integrated database system by mapping data from the loosely structured database to the relational database. Accordingly, IBM now provides support for mapping Domino databases to its DB2 relational database product. Mapping of Domino data to the DB2 database results in data and information being stored in two separate databases. Thus, it is also necessary to record data about the mapping so that data may be recovered. The Domino server therefore creates a small operating system (O/S) file referred to as a stub file in its data directory located on the Domino host that provides a link to the DB2 database. Additionally, it records metadata in a catalog stored in the DB2 database that provides information on the mapping of the Domino stub file and the corresponding DB2 tablespace that contains the real data.

The importance of backing up mission-critical data in computer systems is well known. Although the reliability of computer equipment has improved greatly in recent years, system and hardware failures still occur, sometimes with catastrophic results. It is important, therefore, to back up computer systems to protect them from the loss of valuable data and to enable recovery of that data in the event of a failure. In a network environment, where users depend upon shared data and the amount of data grows continuously, the need to protect and manage data becomes even more critical. A viable backup strategy includes regular backups of databases, as well as backups of archive logs. Without archive logs, a database may only be recovered up to the time of its last full backup.

For integrated database systems, such as Domino-DB2 databases, it is also necessary to back up the metadata and mapping information in the catalog, so that in the event of a failure, the data as well as the catalog mapping information may be recovered and restored.

IBM provides guidance as to how to backup and recover Domino data stored in DB2. However, the steps are manual, require an in-depth knowledge of DB2 and Domino, and are error prone. Separate methods are used to independently backup and recover data stored in a traditional format in the Domino database and backup and recover data stored in the DB2 database. Moreover, after DB2 data has been recovered, it is necessary to ensure that the Domino server is aware of that recovered data by manually recreating the operating system (O/S) stub file, and by updating the DB2 catalog of metadata for the Domino data stored in DB2.

It is desirable to facilitate the backup and recovery of integrated databases, such as Domino and DB2 databases, by providing automated and programmatic approaches for backup and recovery that avoid the difficulties and errors associated with the current approaches. It is to these ends that the present invention is directed.

DESCRIPTION OF PREFERRED EMBODIMENTS

The invention is particularly well adapted to the backup and recovery of an integrated database system comprising linked databases that have different database models or structures. More particularly, the linked databases may comprise a document-based, schema-less loosely structured or unstructured database, such as, for example, Lotus Notes/Domino, and a rather well structured relational database such as, for example, DB2, and will be described using an integrated Lotus Notes/Domino and DB2 database system as a preferred embodiment. As will be appreciated, however, that this illustrative of only one utility of the invention and that the invention may be employed advantageously with other types of databases.

Figure 1:
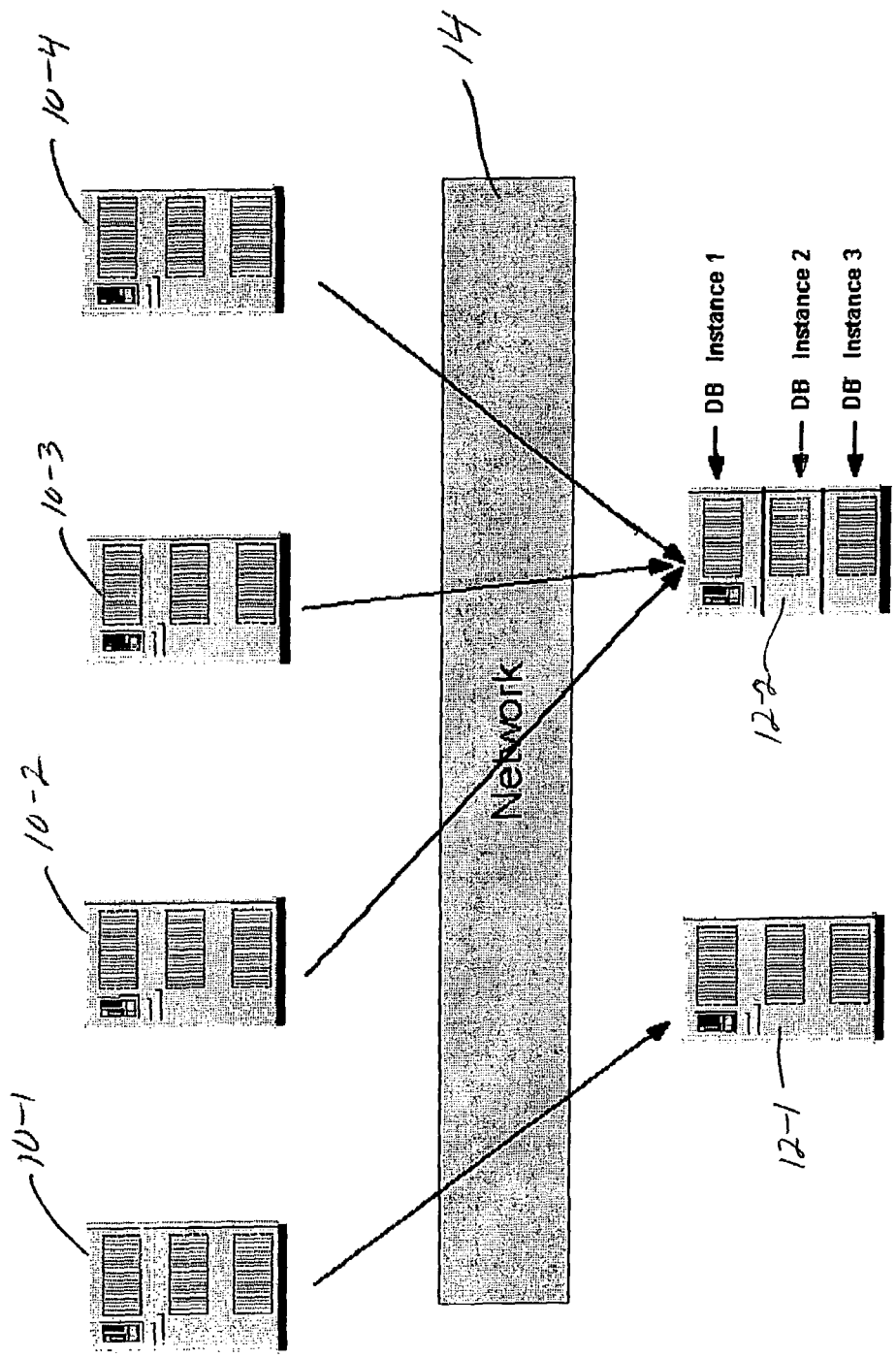
FIG. 1 illustrates a network of linked databases of the type with which the invention may be employed.

FIG. 1 illustrates a network arrangement of linked databases of the type with which the invention may be employed. As shown, the network arrangement may comprise a plurality of first host machines 10-1, 10-2, 10-3 and 10-4, each of which may comprise servers and a database having a first database structure. The first host machines may connect via a network 14 to one of a plurality of second host machines 12-1, 12-2, each of which may comprise a server for other databases having a second database structure. As indicated, host (server) 12-2 may run, for example, multiple instances of the second database, three such instances being shown as an example in the figure. As shown, server 10-1 may connects to server 12-1 via the network 14, while servers 10-2, 10-3 and 10-4 may all connect to different instances of the database running on server 12-2. As indicated in FIG. 1, each of the first databases may be linked to a single different second database instance. The first and second databases may have different structures. The first database be a loosely structured, schema-less database, such as Lotus Notes/Domino, for example, and the second database may be a relational database, such as DB2, for example. Together the linked databases comprise an integrated database system.

As will be described more fully below, certain of the loosely structured data in a first database may be converted, mapped to and stored in a second relational database instance. This advantageously permits a client on one of the first hosts 10-1, 10-4 to employ relational constructs and SQL queries to access the converted data stored in a second relational database. The structured relationship of data in relational databases, such as in DB2, and the use of relational constructs and SQL queries for accessing that data is well known and understood by those skilled in the art.

With the release by IBM of Lotus Domino 7.0, Domino data may be stored either in the Domino database in an operating system (O/S) file format having a .nsf file extension and known as a NSF format (a traditional format used by previous Domino versions) or mapped to a linked DB2 database and stored in a relational database format for Domino data referred to as NSFDB2. A single client on the Domino server may manage databases stored in both formats. The linked Domino and DB2 relational databases may be installed on the same computer in a local configuration, or installed on different computers in a remote or network configuration, such as shown in FIG. 1.

As will be described, the invention comprises programmatic systems and methods for automatically backing up and restoring data and associated mapping information in integrated linked databases, such as Lotus Notes/Domino and DB2. Accordingly, an understanding of the invention will be facilitated by a better understanding of the structure and operation of the Lotus Notes/Domino product. Therefore, prior to describing the invention, the logical arrangement of the Domino database, the mapping of Domino data into relational database format for storage on DB2, and the creation of appropriate links and catalogs of map data will first be described.

Figure 2:
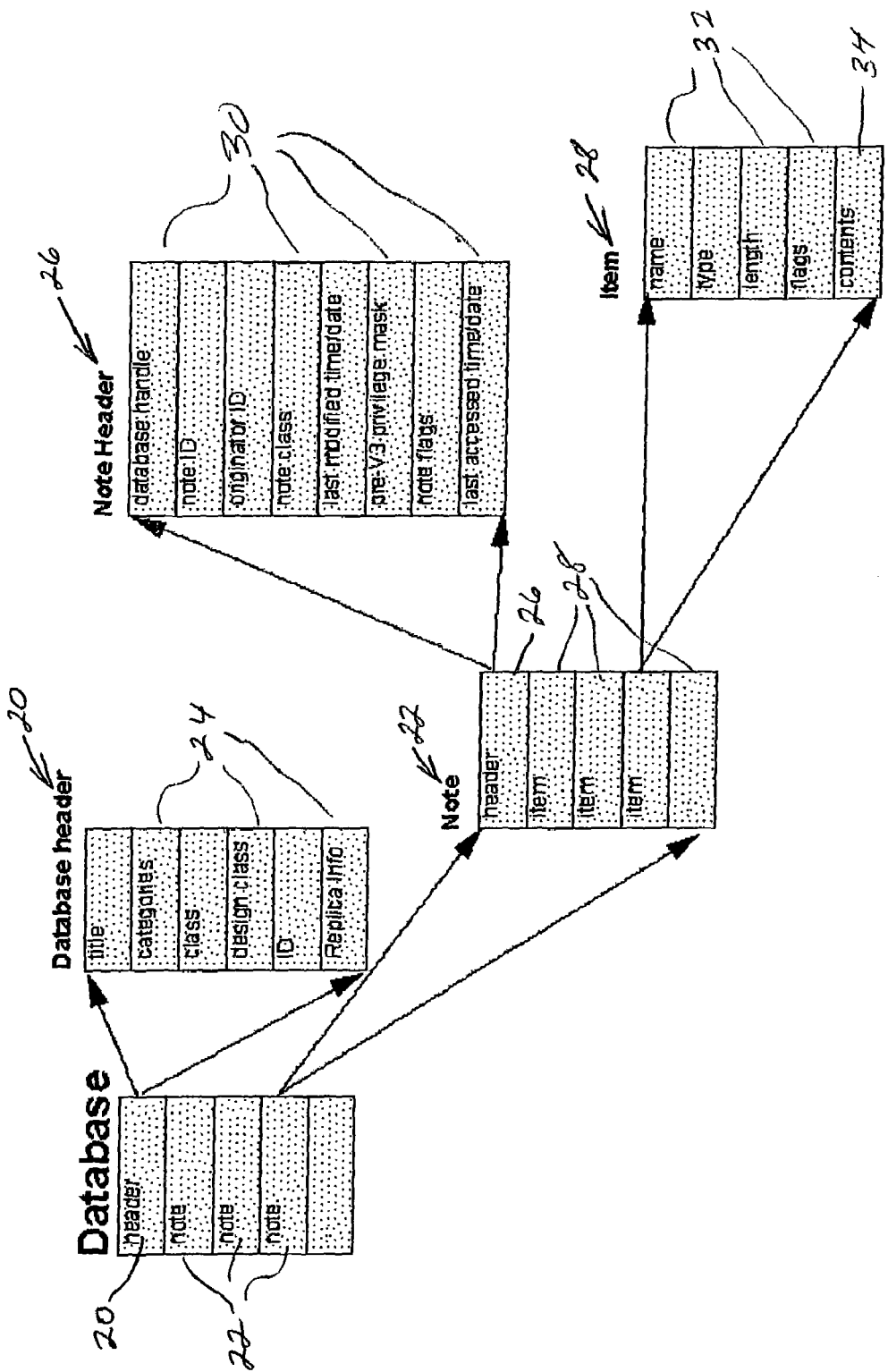
FIG. 2 is a diagrammatic view illustrating the logical arrangement of a database of a client/server collaborative application software product (such as Lotus Notes) as an example of the type of database with which the invention may be employed.

As previously indicated, the Lotus Notes/Domino product is a groupware system that provides collaborative applications such as e-mail, calendaring, instant messaging, etc. It is also a platform for developing customized client-server and web applications. The database is essentially a document-based, schema-less, loosely structured database that allows multiple values in items (fields) and affords full text searching capabilities. It is an example of a loosely structured database of the type which may be mapped into a relational database (to take advantage of constructs and SQL queries available with relational databases) to afford linked databases of the type with which the invention may be employed. FIG. 2 illustrates the logical view of the structure of a Domino database.

Referring to FIG. 2, a Domino database comprises a header 20 followed by a plurality of notes 22, which are also referred to as "documents". A note is the general data structure of the basic unit of data storage in the database. A note may hold and organize a variety of different types of information. Notes may include, for example, design notes (such as forms, views, folders, navigators, outlines, pages, framesets, agents, and resources), dated documents, profile documents, access control lists, and collections (indexes). The database header 20 may comprise a plurality of database attributes 24, such as a title, information on categories, class or design class, an identifier, and replica information. Each note 22 may comprise a header 26 followed by a plurality of items or fields 28. The note header 26 may comprise a plurality of attributes 30 about the note, including a note I.D., information on the originator of the note, a note class such as whether the note is a design note or a document note, for example, and information on when the note was created, modified or last accessed. An item 28 of a note also comprises a plurality of attributes 32 followed by the contents 34 of the note. Each note within a single database may have a different structure and length. Attributes 32 provide information on each particular item of a note. Each item has, for example, a name, a type, a length, and may optionally have various flags set. Different items may have the same name, and type include information such as number, number lists, text, text lists, date-time, date-time lists, and rich text. Flags may be used for managing attributes associated with each item, such as read or write security. Items in design notes may represent the programmed elements of a database as, for example, the layout of an entry form which may be stored in rich text. This enables the design of the database to replicate a user's desktop.

Figure 3:
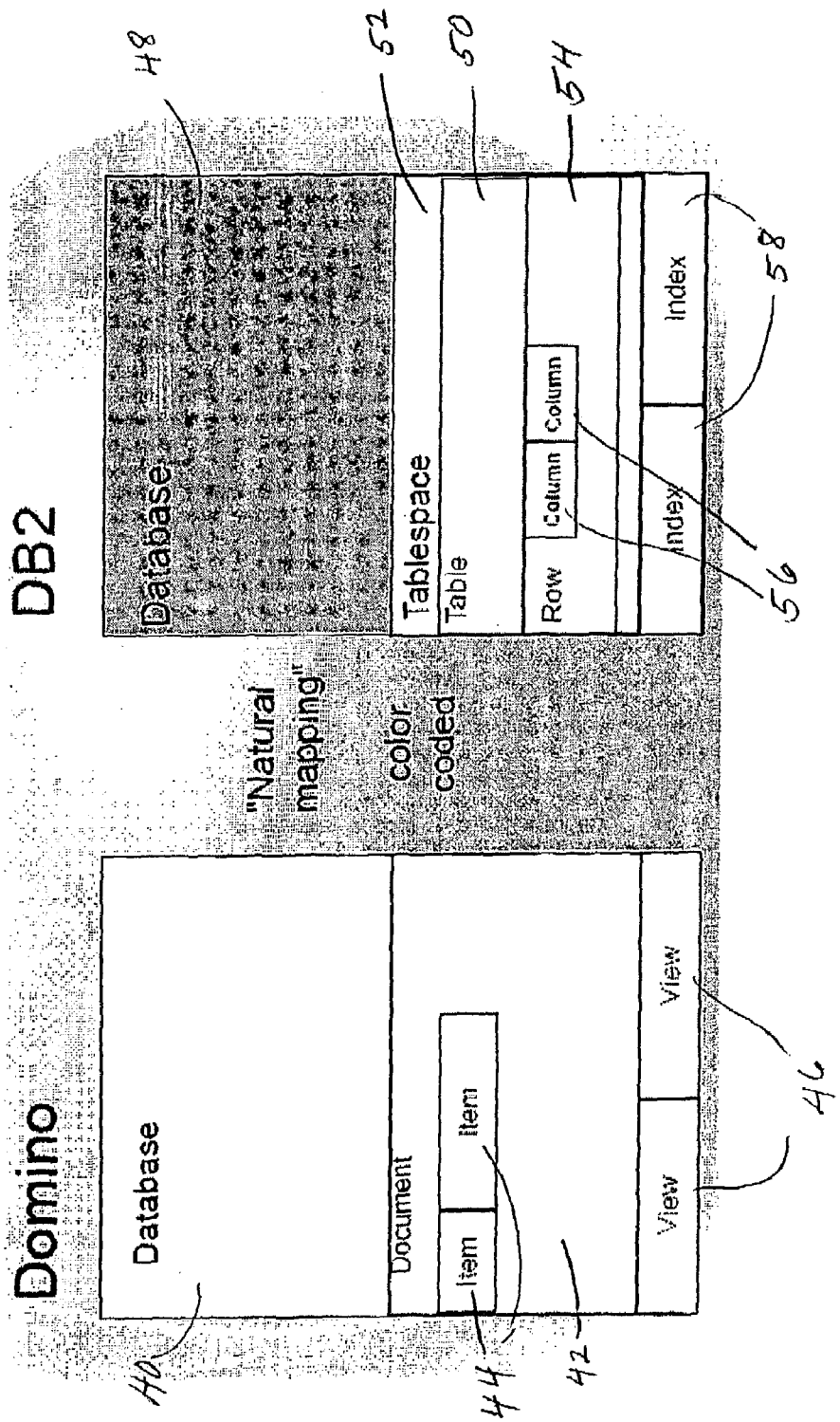
FIG. 3 illustrates the mapping between the database of FIG. 2 and a linked relational database such as DB2.

Tools are available that enable a database in one format to be mapped into a database in a different format. In Domino version 7.0, IBM has provided a tool that enables a Domino database to be mapped into a DB2 relational database format. FIG. 3 is an example that illustrates such mapping.

Referring to FIG. 3, a Domino database 40 comprises a single operating system (O/S) file in an NSF format. The Domino database contains both documents (data) 42 comprising items 44, as well as views 46. Views comprise the various arrangements that display different parts of data. In a DB2 database 48, documents and views are separated. Domino documents 42 are stored in DB2 tables 50 within a tablespace 52, and Domino views 46 are stored in DB2 indexes 58. A single DB2 tablespace 52 may contain one or more, typically eight, Domino databases.

A Domino document 42 may occupy one or more table rows 54. Most of the Domino data in the Domino database is encoded in a traditional Domino NSF format, but may be stored in DB2 as graphics data analogous to a BLOB (Binary Large Object). Individual items 44 of a Domino database may be mapped to columns 56.

Figure 4:
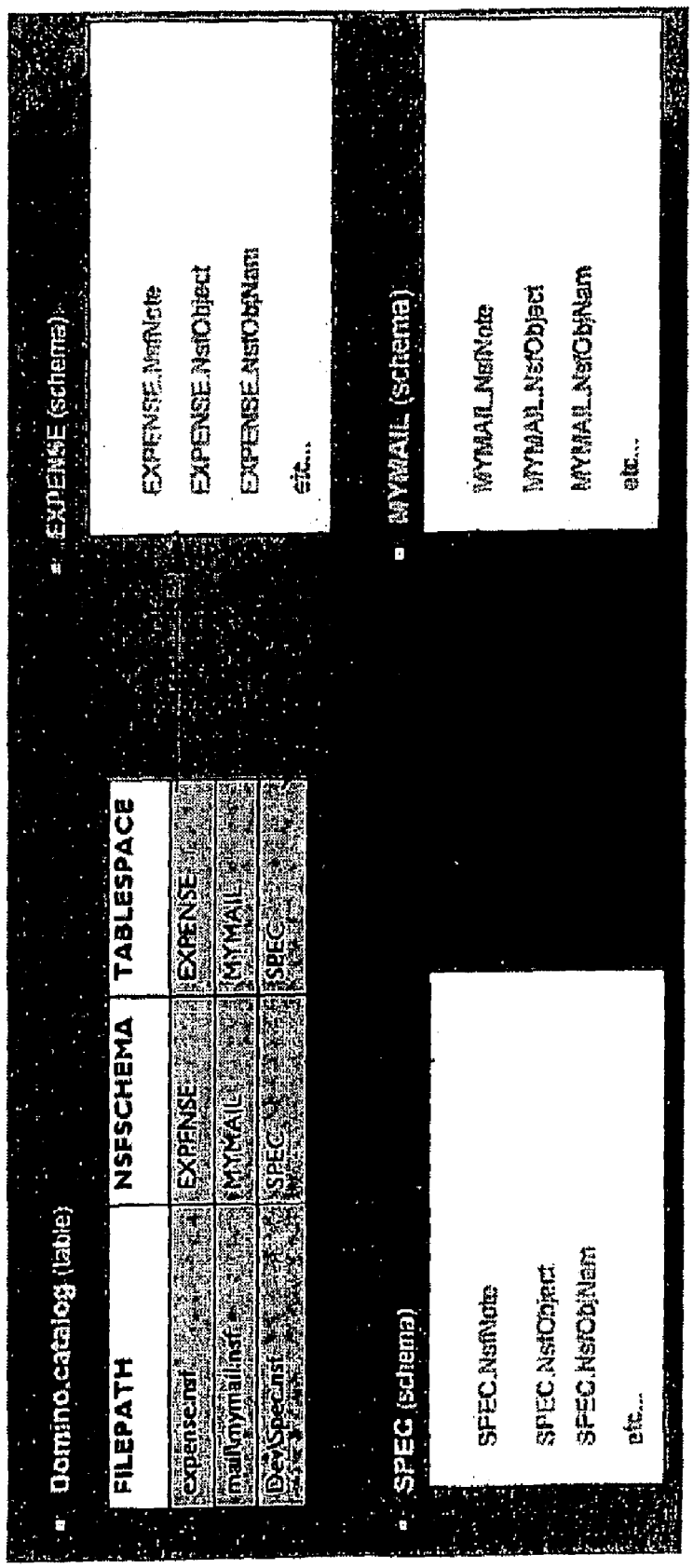
FIG. 4 is diagrammatic view of a catalog that lists the mapping of databases of the type illustrated in FIG. 2 with corresponding schemas, and tablespace names relative to a data directory of the database.

Upon storing Domino data in a DB2 tablespace (as NSFDB2 data), the Domino server creates a small O/S stub or link file for that database in its data directory located on the Domino host. This O/S stub file is also referred to as a NSFDB2 link file, indicates that the actual data is stored in DB2 tablespace. The server also creates, stores in DB2, and maintains a master catalog table referred to as a Domino catalog (an example of which is illustrated in FIG. 4) that contains metadata and mapping information between the Domino stub file and the corresponding DB2 tablespace that contains the real data. This catalog maps names between the Domino and DB2 databases. There is one Domino catalog per DB2 database that lists the metadata and mapping information of all of the Domino databases, e.g., stub file's O/S path (FILEPATH in the table) is mapped to corresponding schema and tablespace name in the relational database (NSF-SCHEMA, TABLESPACE in the table). A Domino server can manage both Domino and DB2 formats.

Although IBM provided tools to integrate and link the Notes/Domino and DB2 databases, IBM has not provided any tools or mechanism for programmatically backing up and restoring the integrated and linked databases. Presently, in order to backup and recover data stored in the linked databases, a user must employ traditional Domino methods (Lotus C APIs) to backup and recover data stored in the traditional Domino format, and must then use DB2 command line interfaces to backup and recover Domino data stored in the DB2 database. These two methods are independent of one another. They do not afford an integrated programmatic approach.

Figure 5:
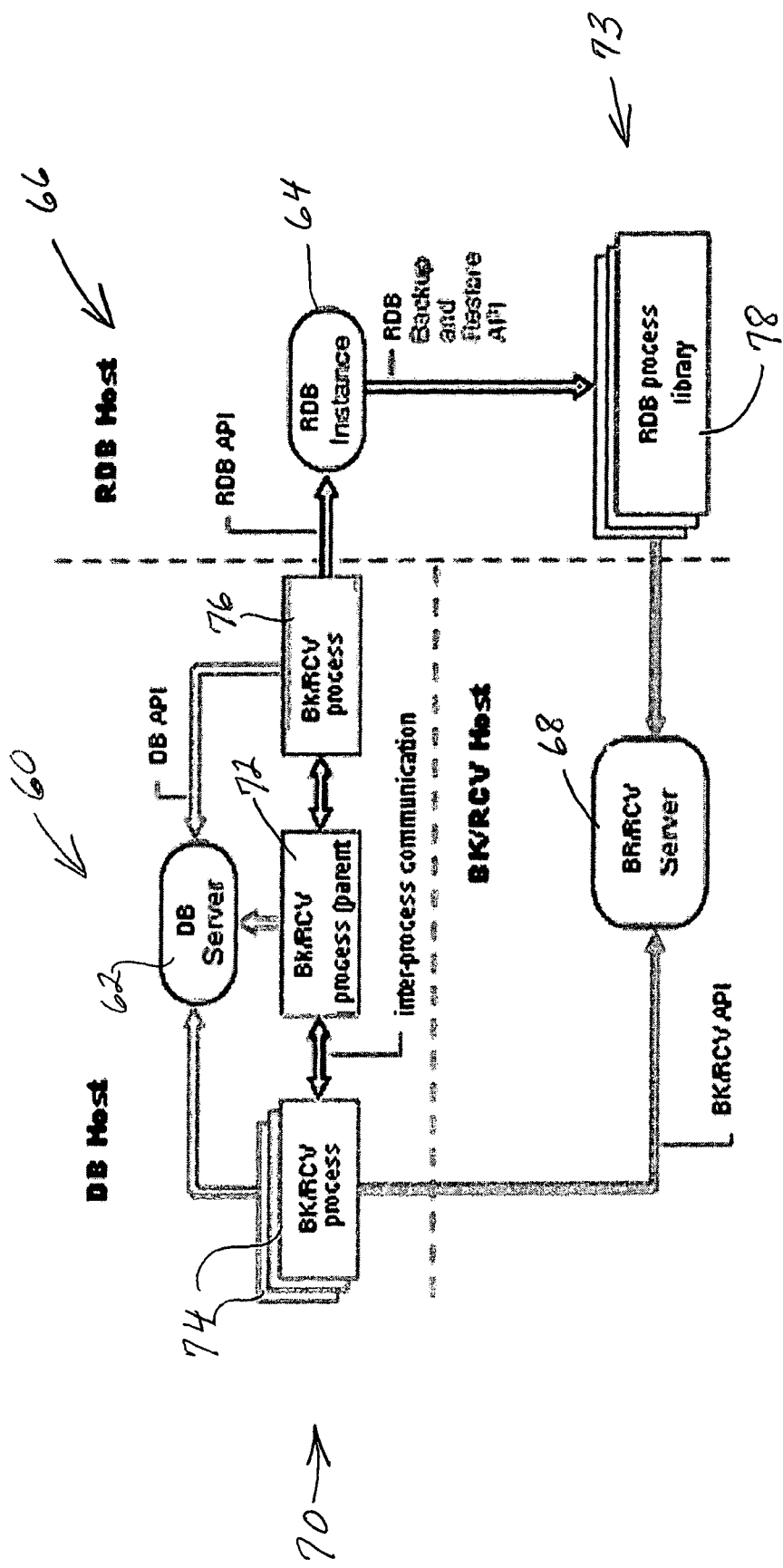
FIG. 5 is a diagrammatic view illustrating the general architecture of the backup and recovery modules and processes of the invention.

The invention addresses this problem by providing an automated and programmatic client-server backup and recovery system and method comprising backup/recovery client and server software. FIG. 5 illustrates the general architecture of the backup/recovery software processes of the invention. The figure shows, as an example, a first loosely structured database (DB), e.g., Domino, running on a first database server 62 of a host 60, and a second relational database (RDB) 64, e.g., DB2, running on a second database host 66. As shown, the backup/recovery (BK/RCV) client-server software may comprise a backup/recovery (BK/RCV) server module which runs on a (BK/RCV) server 68 that manages backup media (not shown), and separate backup/recovery (BK/RCV) client modules 70 and 72 comprising pluralities of binaries (processes) which may run on clients on hosts 60, 66 for the databases. Client index entries may be stored under the client name that contains the data being backed up, e.g., Domino files including the NSFDB2 data links may be stored under the Domino host name, and the DB2 database and/or tablespace backups may be stored under the DB2 host name. The backup server, which needs to keep track of the backup data, may store the data on the backup media under the same names.

Figure 6:
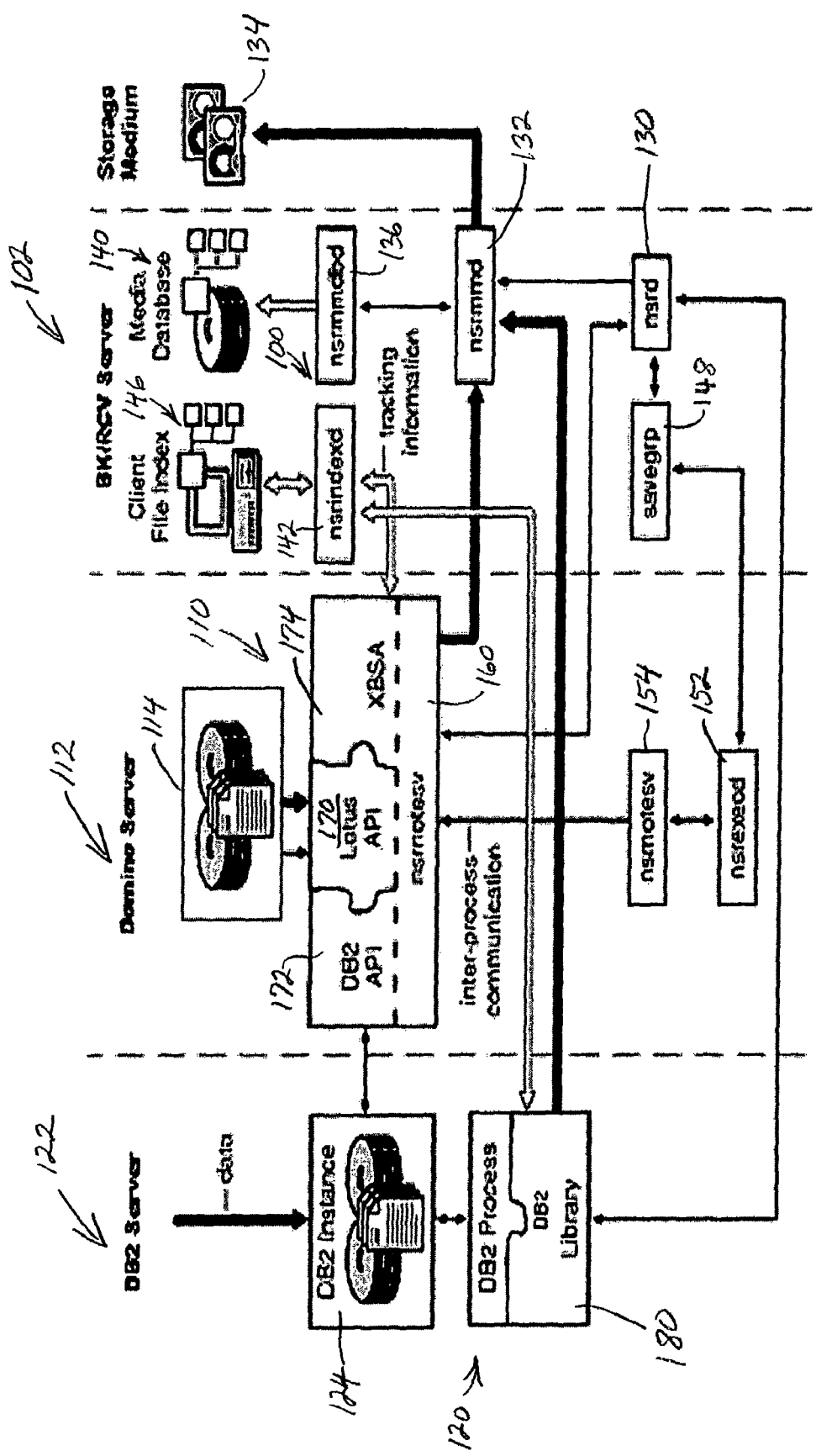
FIG. 6 illustrates a backup process for linked databases in accordance with the invention.
Figure 7:
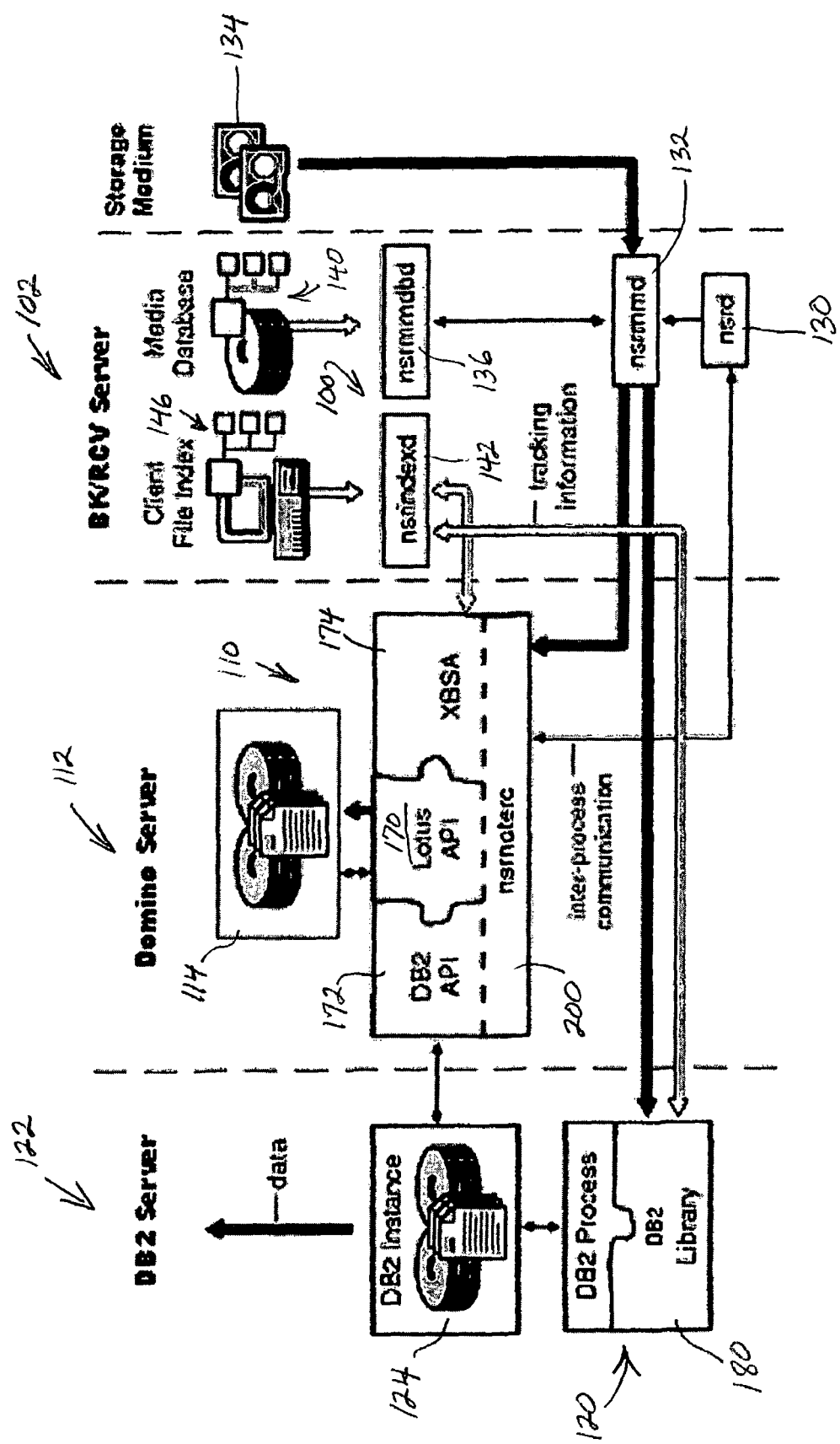
FIG. 7 illustrates a recovery process in accordance with the invention for recovering and restoring data in a linked database arrangement.

The first backup/recovery (BK/RCV) client module 70 for the loosely structured database, e.g., Lotus Domino, may manage the overall back up and recovery processes. As shown, the backup/recovery client module 70 may comprise a parent process (binary) 72 that communicates with a plurality of processes 74 that are used by the client on the server 62, and another binary process 76 that may also communicate with the client on server 62 and with the second relational database (RDB) 64. The binaries 74 and 76 may use APIs for communication. Server module 68 may incorporate a scheduler for automating backup at certain prescheduled times, and with which a user may interface to manage backup and recovery. The second backup/recovery client module 73 may run on the client of RDB host 66, and may also comprise binaries (processes) and libraries 78 for communication with the backup server 68 and with the relational database 64. More details about the backup and recovery modules and their operation will be provided below in the context of Lotus Notes/Domino and DB2. FIGS. 6 and 7, respectively, illustrate the backup and recovery processes, and the operation of the backup/recovery server and client modules in this context.

Referring to FIG. 6, the backup/recovery (BK/RCV) server module 100 of the backup and server product resides on a backup server host 102, which as indicated above, may be a network server. A Lotus BK/RCV client module 110 may run on a Domino server host 112 for the Domino database 114, and a DB2 BK/RCV client 120 may run on a DB2 server host 122 which may host a DB2 instance 124. The Lotus Domino data stored on host 112 comprises Domino databases stored in a traditional Domino NSF format, comprising operating system (O/S) files with an extension .nsf, O/S stub link files for databases stored in DB2, and configuration and other Lotus system files. The DB2 server host 122 stores the DB2 database 124 which includes the Domino NSFDB2 data.

The backup and recovery server and client modules of the invention may comprise a plurality of binaries, which correspond to different processes as previously described, that perform various functions in the backup and recovery processes. Referring to FIG. 6, the backup and recovery server module 100 may comprise the following processes:

i) nsrd 130 comprising the main server process that coordinates all of the other backup and recovery processes and requests from the backup and recovery client modules;

ii) nsrmmd 132 comprising a process that stores and retrieves data to or from storage medium 134 during backup and recovery;

iii) nsrmmdbd 136 comprising a process that stores and retrieves tracking information about the backups for each storage medium in a backup and communicates with a recovery index 140 referred to as a media database;

iv) nsrindexd 142 comprising a process that stores and retrieves tracking information about the backups for each backup and recovery client in a client file index 146; and v) savegrp 148 comprising a scheduler backup binary that contacts the client modules that need to be backed up at a scheduled time.

On the Lotus BK/RCV client 110, two principal processes are nsrexecd (152) which communicates with the savegrp process 148 of the server module 100, and nsrnotesv (154) which sets the required parameters for backup and invokes or spawns other similar processes depending upon the files and data to be backed up, as will be explained more fully below.

A backup process may be started by a user as a manual or ad hoc process by running the backup command nsrnotesv 154 with command-line arguments and environment variables using the command-line interface provided by the Lotus BK/RCV client 110. Backup preferably, however, is scheduled backup process performed automatically at pre-determined scheduled backup times.

During backup, the Lotus BK/RCV client 110 may generate a list of NSFDB2 databases to be backed up, map the databases to correct DB2 tablespaces, and send a request to the DB2 server host 122 for backup. The client 110 will then backup the NSFDB2 link files and store some metadata in a backup server module index file 142 to be able to restore the related DB2 tablespaces. During a restore, the Lotus BK/RCV client 110 may query the indexes. If it finds that an entry is for an NSFDB2 database, it will use the metadata stored in the entry to restore the DB2 data. The client may then update the Domino environment.

FIG. 6 illustrates the backup process. At a scheduled backup start time on the backup/recovery (BK/RCV) server 100 the server's main process, nsrd 130, invokes the savegrp process 148. The savegrp process on the server module contacts the nsrexecd process 152 on the Lotus BK/RCV client 110.

On client 110, process nsrexecd starts the backup binary process nsrnovtesv 154. Process 154 sets the required parameters for the backup and invokes another nsrnotesv process 160, referred to as the parent process. This may be required because certain operating systems do not permit a process to change its execution parameters after the process has started. The parent nsrnotesv process 160 may perform a number of different functions. It may process the backup parameters passed by the savegrp process 148 command and set in the configuration file, including parameters that enable the DB2 backup as a part of the Lotus backup process. Additionally, process 160 may generate a list of files to backup either based upon options specified by a user or included in a scheduled backup script. These files may include Domino regular NSF databases (i.e., not DB2-enabled), NSFDB2 files, and other Domino files. The parent process 160 may use function calls provided by a Lotus API 170 to determine whether the specified files are regular files stored in the Domino database 114 or whether the data is stored in database DB2 124. It may then store the list of files in shared memory for access by other nsrnotesv processes spawned by the parent process 160. These other processes are referred to as child processes.

If a DB2 backup is enabled, the parent process nsrnotesv 160 may spawn one child process nsrnotesv (not shown explicitly) to backup up the DB2 tablespaces or database containing the Domino data. It may then spawn one or more child nsrnotesv processes (also not shown) to backup Domino data not stored in DB2, including the NSDB2 link files. The number of child processes spawned depends upon the number of Domino files to be backed up and the backup parallelism. Each child process manages the backup of an associated Domino file. Additionally, the parent nsrnotesv process 160 monitors the execution of the various child processes and, if required, backs up Domino transaction logs and updates the Lotus BK/RCV client backup catalog file.

The various nsrnotesv child processes that are spawned to backup non-DB2 data communicate with the Domino server 112 to backup Domino data by using the Lotus API 170, and by using a BK/RCV client API (XBSA) 174 to transfer the data to the backup server storage medium 134 by communicating with the backup server 100 using process nsrmmd 132. Additionally, the BK/RCV client XBSA API 174 may create tracking information for the backed up data and place the information in the backup indexes 146 by communicating via process nsrindex 142.

A child process nsrnotesv that is spawned to backup DB2 data performs a number of different functions. It processes the DB2 and DB2 client parameters from a Lotus client configuration file; connects via the DB2 API 172 to the DB2 instance 124 containing the Domino data; requests that the DB2 instance 124 backup either the DB2 tablespaces or the whole DB2 database, depending upon whether a full database-level or a tablespace-level backup is specified, and then disconnects from the DB2 instance.

When the DB2 server 122 receives a backup requests from the Lotus BK/RCV client 110, it starts a DB2 backup process that loads a DB2 client library 180 belonging to DB2 BK/RCV client 120 and uses the library's API to backup the data to the storage medium 134 of the backup server 100.

For an ad hoc (manual) backup, a user may start the backup process on the Lotus client 110 by running the backup command nsrnotesv with the desired parameters. The process is started with the parent nsrnotesv process, and backup proceeds in a similar fashion to that described above for a scheduled backup, except that the parameters specified by the user instead of parameters passed by the savegrp process 148 are used for backup.

FIG. 7 illustrates the recovery process. As previously mentioned, a single DB2 tablespace may contain several NSFDB2 databases, and in particular, up to eight databases. The DB2 restore granularity is at a tablespace level. Accordingly, an online in-place recovery of a tablespace into the same active tablespace is not possible. Therefore, the Lotus backup/recovery client supports recovery of a DB2 tablespace or a database image to an alternative new DB2 database within the same DB2 instance. This requires that the catalog in DB2 be recreated and updated.

In accordance with the invention, recovery is a programmatic process that runs automatically upon being initiated, and may recover both Domino and DB2 databases as well as related files. A DB2 recovery may be initiated by a user entering an appropriate command on the Lotus BK/RCV client 110 to invoke an nsrnotesrc binary process 200. On the BK/RCV client 110, this nsrnotesrc process may perform a number of different functions. These functions may process restore parameters that are set into a configuration file, including parameters that enable the DB2 recovery and determine the Domino files to restore. These files may include regular NSF databases, NSFDB2 files, and other Domino files. The process 200 may then store the list of files in shared memory for access by child processes during recovery.

If a DB2 recovery is enabled, the process nsrnotesrc 200 spawns one child process nsrnotesrc (not explicitly shown) to recover the DB2 tablespaces or database containing the Domino data. It may additionally spawn other child nsrnotesrc processes (also not explicitly illustrated) to recover Domino data not stored in DB2, including the NSFDB2 link files. The number of child processes spawned depends on the number of Domino files to be recovered and the parallelism. The parent process may monitor the execution of the child processes, and when the child processes successfully finish the recovery, restore the Domino logs, if requested by the Domino server 112.

The child nsrnotesrc processes spawned to restore non-DB2 data restore the data using the Lotus Notes API 170 and the Lotus BK/RCV client XBSA API 174. The child nsrnotesrc process spawned to recover DB2 data may perform the following functions. It processes the DB2 and the DB2 BK/RCV client parameters, connects to the DB2 instance 124 that contains the NSFDB2 database to be restored using DB2 API 172, and during a tablespace level restore, sets DB2 registry parameters with commands that identify the tablespaces to be restored and enable the restore process to proceed.

The child nsrnotesrc process may additionally request using DB2 API 172 that the DB2 server 122 performs several functions. These functions may comprise restoring the specified NSFDB2 database or tablespaces to the new temporary database; creating new containers for the restored tablespaces in the temporary database; during a tablespace level restore, unsetting DB2 registry parameters that identified tablespaces to be restored; requesting that the DB2 server roll forward the restored database to a point in time determined by an input from the user; and, finally, disconnecting from the DB2 instance. The DB2 server may further copy the requested NSFDB2 databases determined from a list of NSFDB2 files requested for recovery from the temporary database to the target database using the Lotus API calls. The Lotus Notes API 170 may determine the tablespace into which the data is restored. Since the tablespace into which the data is restored may not be the same tablespace from which it was originally backed up, it also preferably regenerates the NSF links and updates the catalog stored in the DB2 database instance 124.

On the DB2 server 122, when the DB2 BK/RCV client 120 receives the requests from the nsrnotesrc binary 200 of the Lotus BK/RCV client running on the Domino server 112, the DB2 server may start the DB2 restore process that loads the DB2 library 180 and uses the library's API to obtain the data from the backup storage medium 134 on the backup server 100. It further may define the storage containers (the new locations on a disk) for the temporary database; and request that the DB2 client restores the archived logs of the target database to a new log location for the temporary database. It may then roll forward (update) the restored temporary database to bring it current by using the restored logs. This completes the restore process of the DB2 database.

As may be appreciated from the foregoing, the backup/recovery server and client processes provided by the invention advantageously afford an automated programmatic backup and recovery process for the backup and recovery of linked integrated databases having different database structures, such as Lotus Notes/Domino and DB2. This is accomplished by using the APIs provided by the Lotus Notes/Domino and DB2 products, and by invoking and communicating with these APIs using binary processes provided by the backup server and client modules of the invention. While the invention has been described with reference to the Lotus Notes/Domino loosely structured database product and the DB2 structured relational database product, it will be appreciated that the invention is applicable to other databases having different structures, by providing appropriate APIs for each of the databases to enable backup and recovery of specified databases and files, and by invoking and communicating with these APIs using the binary processes according to the principles of the invention.

Accordingly, while the foregoing description has been with reference to a particular embodiment of the invention, it will be appreciated by those skilled in the art that changes in this embodiment may be made without departing from the principles and the spirit of the invention, the scope of which is defined in the appended claims.

The invention claimed is:

1. A computer-implemented method of automatic backup and recovery of an integrated database system comprising first and second linked databases having different first and second database structures that store data of the first database in the second database as same data, a link file indicating the same data stored in the first database that was stored in the second database, and a catalog mapping information identifying where the same data stored in the first database is stored in the second database, the method comprising:

identifying a selected set of data stored in the first database in said first database structure to be backed up;

confirming from said link file that said selected set of data stored in said first database in said first database structure is also stored in the second database in said second database structure;

determining from the catalog mapping information to storage locations of said selected set of data in the second database;

automatically backing up to backup media said selected set of data from said first database and from said second database at the same time, and automatically backing up said link file and said catalog;

upon initiation of a recovery to restore said selected set of data, restoring the selected set of data from the backup media to said first and second databases in said first and second database structures, respectively; and updating said catalog with storage locations of the restored set of data, wherein said backing up comprises backing of logs of said second database, and wherein said restoring comprises employing said logs to update the restored second database data in order to make said second database consistent.

2. The method of claim 1, wherein said first database is a document-centric, schema-less database, and said second database is a relational database.

3. The method of claim 2, wherein said first database comprises a Domino database, and said second database comprises a DB2 database, and wherein said backing up comprises automatically backing up both of said databases.

4. The method of claim 2, wherein said backing up comprises executing application programs to perform a first backup process to back up said selected set of data from said first database and to perform a second backup process to backup said selected set data from said second database.

5. The method of claim 4, wherein said application programs comprise first and second application programs that are executed on one or more server host computers for said first and second databases.

6. The method of claim 4, wherein said second database comprises a plurality of tablespaces, each containing data corresponding to data in one or more first databases, and wherein said second backup process comprises generating a list of tablespaces of said second database to backup using said link file, and backing up data stored in the tablespaces indicated on said list of tablespaces.

7. The method of claim 6, wherein said second backup process communicates with a database manager of said second database to backup data from said second database.

8. The method of claim 5, wherein said backing up of said first and second databases is controlled by said first application program, and wherein said first backup process communicates with said second backup process using said first application program to manage backup of the second database.

9. The method of claim 6, wherein said restoring comprises restoring said selected set of data to said second database to different tablespaces, and updating the mapping of the restored set of data between said first and said second databases.

10. The method of claim 9, wherein said restoring comprises copying at least part of the data restored into said tablespaces to said first database.

11. The method of claim 1, wherein said updating said catalog comprises updating a link to said catalog in a data directory of a host computer of a server of the first database.

12. The method of claim 11, wherein said catalog is located in said second database, and wherein the method further comprises updating said catalog upon said restoring said selected set of data.

13. A system for the automatic backup and recovery of an integrated database that comprises first and second linked databases having different first and second database structures that store data of the first database in the second database as same data, a link file identifying the same data that was stored in the second database, and a catalog mapping information indicating where the same data stored in the first database is stored in the second database, comprising first and second client application programs which are executable by a processor on one or more host computers associated with the first and second databases, and a server application program running on a backup server, said first client application program comprising a plurality of processes that, upon initiation, control said one or more host computers to identify a selected set of data stored in the first database in the first database structure to be backed up;

confirm from said link file that said selected set of data stored in said first database in said first database structure is also stored in the second database in said second database structure as said same data;

determine from the catalog mapping information to storage locations of said selected set of data in the second database; and automatically back up to backup media the selected set of data in said first and second databases at the same time, and to automatically backup said link file and said catalog, and wherein said second client application program comprises other processes responsive to said first client application program processes that control said one or more host computers to automatically restore said selected set of data to said first and second databases in said first and second database structures, respectively, from said backup media, and to update the catalog with storage locations of the restored set of data, wherein said back up comprises backing up of logs of said second database, and wherein said restore comprises employing said logs to update the restored second database data in order to make said second database consistent.

14. The system of claim 13, wherein said plurality of processes communicate with said databases to initiate backup of said databases via application program interfaces.

15. The system of claim 13, wherein said processes comprise a scheduler on said first client application program for initiating backup at a predetermined scheduled time.

16. The system of claim 13, wherein said plurality of other processes of said second client application program further comprise a process that upon initiation automatically copies said selected set of data from the backup media to said first and second databases.

17. Computer readable non-transitory storage media storing instructions executable by a computer system for performing a method of backup and recovery of an integrated database system comprising first and second linked databases having different first and second database structures that store data of the first database in the second database as same data, a link file indicating the same data that was stored in the second database, and a catalog having mapping information identifying where the same data stored in the first database is stored in the second database, the method comprising identifying a selected set of data stored in the first database in the first database structure to be backed up;

automatically confirming from said link file that said selected set of data stored in the first database is also stored in the second database in said second database structure;

automatically determining from the catalog mapping information to storage locations of said selected set of data in the second database;

automatically backing up to backup media said selected set of data from said first and second databases at the same time, and automatically backing up said link file, and said catalog; and upon initiation of a recovery to restore data, restoring the selected set of data from the backup media to said databases in said first and second database structures, respectively, and updating said catalog with storage locations of the restored set of data, wherein said backing up comprises backing of logs of said second database, and wherein said restoring comprises employing said logs to update the restored second database data in order to make said second database consistent.

18. The computer readable non-transitory storage media of claim 17, wherein said instructions comprise application programs executable on one or more server hosts of said first and second databases, said application programs comprising processes that communicate with database managers of said first and second databases to copy said selected set of data of said databases to backup media, and, upon initiation of a recovery, automatically to restore said selected set of data to said databases from said backup media.

19. The computer readable non-transitory storage media of claim 18, wherein said selected set of data is stored in one or more tables in a tablespace of the second database, said processes backing up said selected set of data using said link file to copy said tablespace to backup media, and restoring said data by coping said tablespace from said backup media to a different tablespace in said second database, and updating said catalog to identify said different tablespace.

* * * * *